(12) United States Patent
Zhang

(10) Patent No.: US 12,320,447 B2
(45) Date of Patent: Jun. 3, 2025

(54) CORROSION-RESISTANT DIAPHRAGM VALVE AND ASSEMBLING METHOD THEREOF

(71) Applicant: KOSCN Industrial Manufacturing (Shenzhen) Co., Ltd., Guangdong (CN)

(72) Inventor: Shengzhou Zhang, Guangdong (CN)

(73) Assignee: KOSCN Industrial Manufacturing (Shenzhen) Co., Ltd., Guangdong (CN)

( * ) Notice: Subject to any disclaimer, the term of this patent is extended or adjusted under 35 U.S.C. 154(b) by 5 days.

(21) Appl. No.: 18/585,178

(22) Filed: Feb. 23, 2024

(65) Prior Publication Data
US 2025/0155031 A1 May 15, 2025

(30) Foreign Application Priority Data

Nov. 9, 2023 (CN) .......................... 202311488701.X

(51) Int. Cl.
*F16K 7/12* (2006.01)
*F16K 31/122* (2006.01)

(52) U.S. Cl.
CPC .......... *F16K 7/126* (2013.01); *F16K 31/1221* (2013.01)

(58) Field of Classification Search
CPC .............................. F16K 7/126; F16K 31/1221
See application file for complete search history.

(56) References Cited

U.S. PATENT DOCUMENTS

| | | | | |
|---|---|---|---|---|
| 3,148,861 A * | 9/1964 | McFarland, Jr. | ....... | F16K 7/126 251/368 |
| 5,377,956 A * | 1/1995 | Muller | ......... | F16K 7/126 74/25 |
| 8,322,364 B2 * | 12/2012 | Lacasse | ............. | F16K 27/0281 137/271 |
| 8,794,595 B2 * | 8/2014 | Reed | ........... | F16K 7/126 137/552 |
| 9,109,707 B2 * | 8/2015 | Goulding | ......... | F16J 15/10 |
| 9,157,534 B2 * | 10/2015 | Matalon | ............ | F16K 7/126 |
| 10,077,846 B2 * | 9/2018 | Eurich | ............. | F16K 51/00 |
| 11,181,206 B2 * | 11/2021 | Banzhaf | .......... | F16K 31/1221 |

(Continued)

FOREIGN PATENT DOCUMENTS

DE   102007026887 A1 * 12/2008 ......... B29C 45/0053

OTHER PUBLICATIONS

Translation of DE 102007026887 (Year: 2008).*

*Primary Examiner* — Umashankar Venkatesan
(74) *Attorney, Agent, or Firm* — Cooper Legal Group, LLC

(57) ABSTRACT

Disclosed is a corrosion-resistant diaphragm valve, including a valve cover, a thick film diaphragm sheet clamped and pressed jointly by the valve cover and a supporting block, and a valve seat above which the valve cover is coupled. A first lower opening of the valve cover is embedded with the supporting block to limit a movement space of a pneumatic piston member, and a second lower opening of the supporting block is embedded with a guided diaphragm pressing block, and the diaphragm pressing block is connected to one end of the pneumatic piston member. A straight sealing convex strip extending through a valve head is disposed at a bottom of the thick film diaphragm sheet. A curved runner C-shaped opening is formed in a curved runner structure which is bent upwards in a flattened curve; and the straight sealing convex strip is aligned with and pressed against an arc-shaped dam.

15 Claims, 11 Drawing Sheets

(56) References Cited

U.S. PATENT DOCUMENTS

| | | | | |
|---|---|---|---|---|
| 11,614,178 B2* | 3/2023 | Matalon | ............... | F16K 7/126 |
| | | | | 137/315.05 |
| 2015/0083247 A1* | 3/2015 | Schroder | ............. | F16K 7/126 |
| | | | | 137/560 |
| 2015/0108386 A1* | 4/2015 | Obara | .................... | F16J 3/02 |
| | | | | 251/331 |
| 2019/0301637 A1* | 10/2019 | Volpp | ................. | F16K 7/126 |

* cited by examiner (A)

(B)

(A)

(B)

(A)

(B)

(A)

(B)

CORROSION-RESISTANT DIAPHRAGM VALVE AND ASSEMBLING METHOD THEREOF

CROSS-REFERENCE TO RELATED APPLICATION

This application claims the priority and benefit of Chinese patent application No. 202311488701.X, filed on Nov. 9, 2023. The entirety of Chinese patent application No. 202311488701.X is hereby incorporated by reference herein and made a part of this specification.

TECHNICAL FIELD

The present disclosure relates to the technical field of diaphragm valves, and particularly relates to a corrosion-resistant diaphragm valve and an assembling method for manufacturing the corrosion-resistant diaphragm valve.

BACKGROUND ART

A diaphragm valve is primarily used for delivery of an isolated medium fluid for special use, for example, a medium fluid for semiconductor manufacturing is usually corrosive, thus resulting in corrosion of a conventional metal valve, and due to poor corrosion resistance of a metal locking member used in a flange-type structure and separate design of a metal external valve body and valve cover, leakage caused by aging of an external structural component is likely to occur. The diaphragm valve with a pneumatic actuator has a complex internal structure, and many parts and components, some of which are metal members that are easy to corrode and high in failure rate, so that the valve is short in service life, and high in maintenance cost. However, the reasons that may affect the service life of the valve are not limited to metal corrosion, and the thickness of a diaphragm sheet is also an important reason that may affect the service life of the diaphragm valve.

Further, as the diaphragm sheet becomes thinner, and opening and closing operation of the diaphragm valve becomes clearer, the service life of a corrosion-resistant diaphragm valve becomes shorter. As the diaphragm sheet becomes thicker, the service life of the diaphragm valve becomes longer, but the opening and closing operation is unclear, and thus there is a problem that the valve is not tightly closed due to a gap, or/and an opening degree is insufficient to reach a normal throughput of the diaphragm valve.

SUMMARY

A first main object of the present disclosure is to provide a corrosion-resistant diaphragm valve, aiming at solving the technical problems that the valve is not tightly closed and has a poor throughput in case of a thick film diaphragm sheet, and the valve is short in service life in case of a thin film diaphragm sheet.

A second main object of the present disclosure is to provide production equipment for a semiconductor wet process, which meets the requirement for accurate switching of supply of chemical agents in a production process of the semiconductor wet process, and may be used at a high frequency for a long term.

A third main object of the present disclosure is to provide an assembling method of the corrosion-resistant diaphragm valve, which has the effect of accurately positioning the thick film diaphragm sheet when the corrosion-resistant diaphragm valve is assembled.

The first main object of the present disclosure is achieved by the following technical solution:

provided is a corrosion-resistant diaphragm valve, including:

a valve cover, the valve cover being internally provided with a pneumatic piston member which is elastically pushed outwards, a first lower opening of the valve cover being embedded with a fixed non-rotatable supporting block, a second lower opening of the supporting block being embedded with a guided diaphragm pressing block, and the diaphragm pressing block being connected to one end of the pneumatic piston member;

a thick film diaphragm sheet coupled to the pneumatic piston member, the thick film diaphragm sheet having a valve head connected to the one end of the pneumatic piston member, a bending portion extending outwards from the valve head, and a clamping portion extending outwards from the bending portion, and the clamping portion being provided with a plurality of peripheral through holes or notches; and a straight sealing convex strip extending through the valve head being disposed at a bottom of the thick film diaphragm sheet; and a valve seat coupled with the valve cover by a first connector, the first connector passing through the peripheral through holes or notches of the thick film diaphragm sheet to be connected to the valve cover, so as to clamp the clamping portion of the thick film diaphragm sheet; wherein a thickness of the clamping portion of the thick film diaphragm sheet is sufficient so that the valve seat is not in direct contact with the valve cover; the valve seat is internally provided with a first runner and a second runner separated by an arc-shaped dam, curved runner structures in opposite directions are formed by the first runner and the second runner at adjacent ends, and in a horizontal section along an axis of the runner, a curved runner C-shaped opening is formed in the curved runner structure which is bent upwards in a flattened curve; and when the valve is closed, the straight sealing convex strip is aligned with and pressed against the arc-shaped dam.

The implementation principle of this basic structure example is that the supporting block is utilized for being pre-embedded in the first lower opening of the valve cover to pre-couple pneumatic assemblies such as the pneumatic piston member in the valve cover, driving movement of the pneumatic piston member does not affect closing and opening of the valve except for one end of the pneumatic piston member and the diaphragm pressing block, a lower driving chamber and a pressure relief balancing chamber of the valve cover are separated by the supporting block, the clamping portion of the thick film diaphragm sheet is clamped and pressed jointly by the supporting block and the valve cover, and the pneumatic piston member may better drive the diaphragm pressing block, so that the bending portion of the thick film diaphragm sheet is accurately closed and deformed; in addition, the straight sealing convex strip extending through the valve head is disposed at the bottom of the thick film diaphragm sheet, so as to enhance the effect of closing the valve which is pressed against the arc-shaped dam in the valve seat; further, the thickness of the clamping portion of the thick film diaphragm sheet is sufficient so that the valve seat is not in direct contact with the valve cover, so as to couple the valve seat with the valve cover while the clamping portion of the thick film diaphragm sheet is well clamped; furthermore, the curved runner openings C are formed in the curved runner structures of the valve seat on two sides of the arc-shaped dam, and the curved runner structures are bent upwards in the flattened curve, so that the thick film diaphragm sheet may be opened with a relatively small amplitude, without affecting the throughput and pressure loss of the diaphragm valve when the valve is opened, and when the valve is closed, the straight sealing convex strip may be accurately aligned with and pressed against the arc-shaped dam, the switching between opening and closing may generate obvious fluid outflow and closing, without a dripping phenomenon, which is specifically applicable to the production equipment for the semiconductor wet process.

In a preferred example, the present disclosure may be further configured such that the thickness of the clamping portion of the thick film diaphragm sheet is equal to a thickness of the bending portion; wherein the bending portion has an annular shape outside the valve head, and the clamping portion has a square shape outside the bending portion.

By adopting the preferred technical features of the structure described above, the thickness of the clamping portion of the thick film diaphragm sheet is equal to the thickness of the bending portion, and the thickness of the bending portion is between 80% and 100% of the thickness of the clamping portion, so as to improve the durability of the thick film diaphragm sheet and reduce the deformation and damage of the bending portion. The deformation of the bending portion in a lifting process of the valve head is also facilitated by utilizing the annular shape of the bending portion. The square shape of the clamping portion may improve the positioning effect before clamping and the anti-rotating property after clamping, so that the straight sealing convex strip is not inclined relative to the arc-shaped dam in the case of long-term valve opening and closing. In a preferred example, the present disclosure may be further configured such that the thick film diaphragm sheet further has an anti-rotating resetting convex portion outside the clamping portion, so as to enable the clamping portion of the thick film diaphragm sheet to achieve micro-amplitude resetting in the case of clamping with a non-rotatable alignment feature in a process from closing to opening of the valve.

In a preferred example, the present disclosure may be further configured such that two ends of the straight sealing convex strip extend to an edge of the bending portion. Therefore, when the valve is closed, a portion of the straight sealing convex strip extending to the bending portion is supported by the diaphragm pressing block to be pressed against the arc-shaped dam, so as to improve the valve closing effect of the diaphragm valve. The formation of the straight sealing convex strip is used for solving or avoiding the dripping phenomenon in the case of micro-amplitude mismatching of shapes of a concave arc of the arc-shaped dam and a deformed concave arc of the bending portion of the thick film diaphragm sheet when the valve is closed in a direction YZ of a truncation surface of the runner, wherein a direction X is a moving direction of the runner, a direction Y is a horizontal direction perpendicularly tangent to the runner, and a direction Z is a mounting direction of the valve cover.

In a preferred example, the present disclosure may be further configured such that the supporting block is coupled with the valve cover by a second connector, the second connector aligned with the clamping portion of the thick film diaphragm sheet in position passes through a lug through hole of the supporting block to be connected to the valve cover, and a lug groove is formed in the valve cover at a periphery of the first lower opening to accommodate a lug of the supporting block.

By adopting the preferred technical features of the structure described above, the supporting block and the valve cover are pre-fixed by utilizing the second connector, the position of the second connector is also aligned with the clamping portion of the thick film diaphragm sheet, and the second connector is entirely hidden inside the diaphragm valve and not exposed to the space of the chamber. The diaphragm valve may be used for a long term if the accidental loosening of the second connector may additionally improve the clamping effect of the clamping portion of the thick film diaphragm sheet. The effect that the supporting block is non-rotatably embedded in the valve cover is also achieved by utilizing the lug through hole of the supporting block through which the second connector passes and matching with the lug groove of the valve cover in a manner of being fixed to the valve cover with the relatively short second connector.

In a preferred example, the present disclosure may be further configured such that the lug of the supporting block is adjacent to a coupling hole of the valve cover for being coupled with the first connector; and in a preferred example, a peripheral edge of the second lower opening of the supporting block is provided with a sliding groove adapted to a side rib of the diaphragm pressing block, and an anti-rotating guide flange is formed by the side rib of the diaphragm pressing block for the diaphragm pressing block to be driven to longitudinally sliding up and down in a unrotatable manner.

By adopting the preferred technical features of the structure described above, the lug of the supporting block is adjacent to the coupling hole of the valve cover for being coupled with the first connector, namely positions of the second connector and the first connector are adjacent to each other, so that the second connector is relatively away from the bending portion of the thick film diaphragm sheet and closer to the edge of the clamping portion. The peripheral edge of the second lower opening of the supporting block is provided with the sliding groove adapted to the side rib of the diaphragm pressing block, so that the supporting block has the function of guiding the sliding of the diaphragm pressing block.

In a preferred example, the present disclosure may be further configured such that the supporting block further has a lateral inner vent hole and an axial guide sleeve for sliding of the one end of the pneumatic piston member.

By adopting the preferred technical features of the structure described above, by utilizing the inner vent hole, when the pneumatic piston member moves downwards to close the valve, air in the axial guide sleeve is extruded and discharged to the pressure relief balancing chamber, so as to accelerate the action of valve closing and maintain a closing force, wherein an air pressure in an upper driving chamber above a piston disk is greater than an air pressure in a lower driving chamber below the piston disk, the lower driving chamber is a relatively closed chamber, and the pressure relief balancing chamber at the periphery of the supporting block is communicated with the external air pressure.

In a preferred example, the present disclosure may be further configured such that the diaphragm pressing block is provided with a non-circular hole adapted to the one end of the pneumatic piston member in shape; and the valve head of the thick film diaphragm sheet is connected to the one end of the pneumatic piston member to be detachably connected to the diaphragm pressing block.

By adopting the preferred technical features of the structure described above, by utilizing the shape of the diaphragm pressing block adapted to that of the one end of the pneumatic piston member, when the diaphragm pressing block may not rotate, the pneumatic piston member may not rotate arbitrarily, and the diaphragm sheet is less susceptible to torsional stress and has a longer service life. The valve head of the thick film diaphragm sheet is connected to the one end of the pneumatic piston member, so that the diaphragm pressing block is limited and fixed above the valve head of the thick film diaphragm sheet.

In a preferred example, the present disclosure may be further configured such that the diaphragm pressing block is provided with a plurality of lightening cavities at a periphery of the non-circular hole, so as to reduce the weight of the diaphragm pressing block to facilitate lifting and sliding driven by the pneumatic piston member.

In a preferred example, the present disclosure may be further configured such that the thickness of the bending portion is not less than 80% of the thickness of the clamping portion, so that an amount of deformation of the bending portion in an upper arc of valve opening does not exceed an upper edge of the clamping portion, and an amount of deformation of the bending portion in a lower arc of valve closing does not exceed a lower edge of the clamping portion.

By adopting the preferred technical features of the structure described above, by defining the portion of the thick film diaphragm sheet, the amount of deformation of the bending portion in the upper arc of valve opening does not exceed the upper edge of the clamping portion, so that there is a relatively small amount of deformation in the upper arc and the lower arc, the thick film diaphragm sheet has high durability, and in combination with other necessary technical means, the diaphragm valve also has the features of a large throughput and low pressure loss.

In a preferred example, the present disclosure may be further configured such that the pneumatic piston member has a piston disk, a guide rod disposed above the piston disk, and a piston rod disposed below the piston disk; and the corrosion-resistant diaphragm valve further includes: an elastic member sleeved on the guide rod and elastically contacting the piston disk, so that the one end of the pneumatic piston member protrudes without an external force.

By adopting the preferred technical features of the structure described above, by utilizing the specific structure of the pneumatic piston member, based on upper guide of the guide rod on the valve cover and lower guide of the piston rod on the supporting block, the piston disk is not inclined, the upper driving chamber and the lower driving chamber in the valve cover are separated, and the one end of the pneumatic piston member may move axially in the direction Z. Also, by utilizing the arrangement relationship of the elastic member, the elastic member is positioned in the upper driving chamber, and the one end of the pneumatic piston member remains protruding without the external force, thereby facilitating the mounting of the thick film diaphragm sheet and the diaphragm pressing block on the pneumatic piston member, and allowing the valve cover and the valve seat to be assembled in a valve closing state, so as to obtain a better valve closing effect.

In a preferred example, the present disclosure may be further configured such that the supporting block has an upwardly open air chamber groove to increase a space of a lower driving chamber of the valve cover below the piston disk.

By adopting the preferred technical features of the structure described above, the air chamber groove of the supporting block is utilized to maintain a minimum volume of the lower driving chamber in the valve closing state, and in the valve closing state, the valve closing effect may not be affected as the air pressure in the driving chamber is not increased too quickly due to the downward movement of the pneumatic piston member and the piston disk thereof.

In a preferred example, the present disclosure may be further configured such that the valve seat is provided with an upwardly protruding clamping ring at a periphery of a valve port moving at the valve head of the thick film diaphragm sheet, the supporting block has a downwardly facing clamping and pressing surface, and the clamping ring is aligned in the clamping and pressing surface.

By adopting the preferred technical features of the structure described above, the clamping ring of the valve seat is utilized for being aligned in the clamping and pressing surface of the supporting block, the clamping and pressing surface of the supporting block forms a non-uniform clamping and pressing force to the clamping portion of the thick film diaphragm sheet, and an annular clamping and pressing force may be specially increased above the clamping ring, so as to reduce the sliding of the clamping portion of the thick film diaphragm sheet.

In a preferred example, the present disclosure may be further configured such that a periphery of the piston disk and a periphery of the supporting block are respectively provided with a first sealing ring, and a body of the guide rod and a body of the piston rod are respectively provided with a second sealing ring, so as to divide an internal space of the valve cover into an upper driving chamber, a lower driving chamber, and a pressure relief balancing chamber from inside to outside.

By adopting the preferred technical features of the structure described above, by utilizing the first sealing ring and the second sealing ring, the upper driving chamber, the lower driving chamber, and the pressure relief balancing chamber are established in the valve cover from inside to outside and from top to bottom.

The second main object of the present disclosure is achieved by the following technical solution:
provided is production equipment for a semiconductor wet process, including the corrosion-resistant diaphragm valve according to any practicable combination of features as described above. On the premise of improving the durability of the diaphragm sheet, process agent liquid may be supplied with a large flow and delivered with low pressure loss, without leakage after closing.

The third main object of the present disclosure is achieved by the following technical solution: provided is an assembling method of the corrosion-resistant diaphragm valve according to any practicable combination of features as described above, including:
S1. placing a pneumatic piston member in a valve cover;
S2. fixedly coupling a supporting block in the valve cover in an embedding manner, so that the pneumatic piston member may not be detached from the valve cover, and one end of the pneumatic piston member remains protruding;
S3. connecting a thick film diaphragm sheet to the one end of the pneumatic piston member, wherein the one end is in a protruding state, and a diaphragm pressing block may not be detached from the one end of the pneumatic piston member; and S4. coupling the valve cover to the valve seat, wherein in a valve closing state in which a straight sealing convex strip of the thick film diaphragm sheet may be aligned with and pressed against an arc-shaped dam of the valve seat, the valve cover is coupled by a first connector, and a clamping portion of the thick film diaphragm sheet is clamped and pressed jointly by the valve cover and the supporting block.

The implementation principle of this basic method example is that detachment of the pneumatic piston member is prevented in advance by utilizing the supporting block in step S2. Also, by utilizing steps S3 and S4, in the valve closing state, the valve cover and the valve seat are assembled to ensure a better assembling margin, without changing or weakening the valve closing effect.

In a preferred example, the present disclosure may be further configured such that the assembling method further includes: S5. disposing a corrosion-resistant cap at an exposed end of the first connector; in a preferred example, the assembling method further includes: S6. mounting a socket flanging member at a runner port of the valve seat by a screw sleeve to be fixedly connected to a pipeline.

In summary, the technical solutions of the examples of the present disclosure regarding the structure or method include at least one of the following technical effects contributing to the prior art.

1. Through the combination of the features of the supporting block embedded in the valve cover, the straight sealing convex strip of the thick film diaphragm sheet, the definition of the thickness of the clamping portion, and the curved runner structure in the valve seat, the technical problems that the thick film diaphragm sheet used in the diaphragm valve may cause poor throughput, large pressure loss, and incapability of tightly closing are solved.
2. In closing and assembling processes of the valve, the straight sealing convex strip is aligned with and pressed against the arc-shaped dam of the valve seat, the production equipment applicable to the semiconductor wet process has the features of large flow, low pressure loss, and durability of the diaphragm in the supply of agent liquid; and the semiconductor wet process referred to herein may be broadly defined, including the fields of new energy sources, circuit boards and photovoltaics, and may quantitatively replenish a cleaning solution or/and an etching solution used in the process, so as to meet the requirements of high-speed and high-frequency switching, including corrosion resistance, zero leakage when the valve is closed, long life guarantee for the operation of high-frequency switching, and smooth circulation with small pressure drop when the valve is opened.
3. The clamping of the thick film diaphragm sheet may be achieved while maintaining the valve closing state when the valve cover is coupled with the valve seat through the pre-combination of the pneumatic piston member in the valve cover, the supporting block, the thick film diaphragm sheet, and the diaphragm pressing block; and the coupling stability of the pneumatic assemblies is not affected when the valve cover and the valve seat are detached.

LIST OF REFERENCE SIGNS 10. valve cover; 11. first air cylinder hole; 12. second air cylinder hole;
15. outer vent hole; 16. upper driving chamber; 17. lower driving chamber; 18. pressure relief balancing chamber; 19. gap;
20. thick film diaphragm sheet; 21. valve head; 22. bending portion; 23. clamping portion; 24. peripheral through hole;
25. straight sealing convex strip; 26. anti-rotating resetting convex portion;
30. valve seat; 31. first runner; 32. second runner; 33. curved runner structure; 34. arc-shaped dam;
35. curved runner C-shaped opening; 36. clamping ring; 37. connecting hole; 38. through hole;
40. pneumatic piston member; 41. piston disk; 42. guide rod; 43. piston rod;
50. supporting block; 51. lug through hole; 52. sliding groove; 53. inner vent hole; 54. air chamber groove; 55. clamping and pressing surface; 56. guide sleeve;
60. diaphragm pressing block; 61. non-circular hole; 62. lightening cavity; 63. anti-rotating guide flange;
71. first connector; 72. second connector; 73. corrosion-resistant cap; 74. first sealing ring; 75. second sealing ring;

80. elastic member; 91. socket flanging member; 92. screw sleeve.

DETAILED DESCRIPTION

The technical solutions in the examples of the present disclosure will be described clearly and completely below in conjunction with the accompanying drawings in the examples of the present disclosure. Obviously, the examples described are only a part of the examples for understanding the inventive concept of the present disclosure, and do not represent all the examples, nor do they provide an interpretation of the only examples. Based on the examples in the present disclosure, all other examples obtained by those of ordinary skill in the art on the premise of understanding the inventive concept of the present disclosure fall within the protection scope of the present disclosure.

It should be noted that, if a directional indication (such as up, down, left, right, front, rear . . . ) is involved in an example of the present disclosure, the directional indication is only used for explaining the relative positional relationship, movement condition and the like between components at a certain posture, and if the certain posture is changed, the directional indication is changed accordingly. In order that the technical solution of the present disclosure may be more readily understood, the corrosion-resistant diaphragm valve of the present disclosure will be described and explained in further detail below, without limiting the protection scope of the present disclosure.

Figure 1:
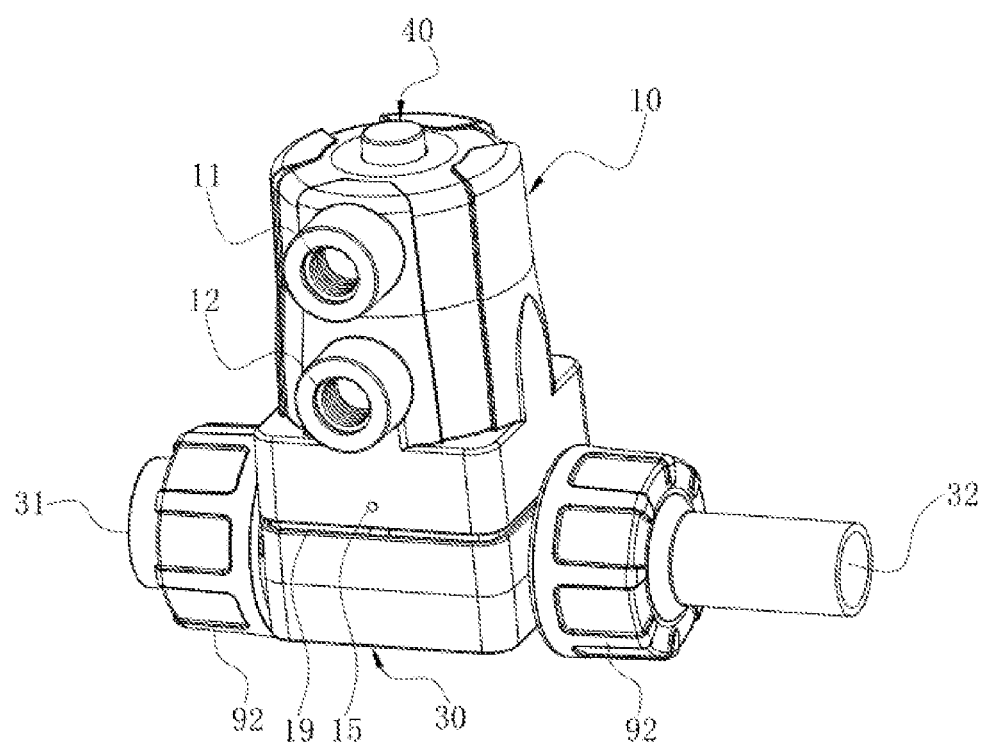
FIG. 1 is a perspective assembling view of a corrosion-resistant diaphragm valve in some preferred examples of the present disclosure.
Figure 2:
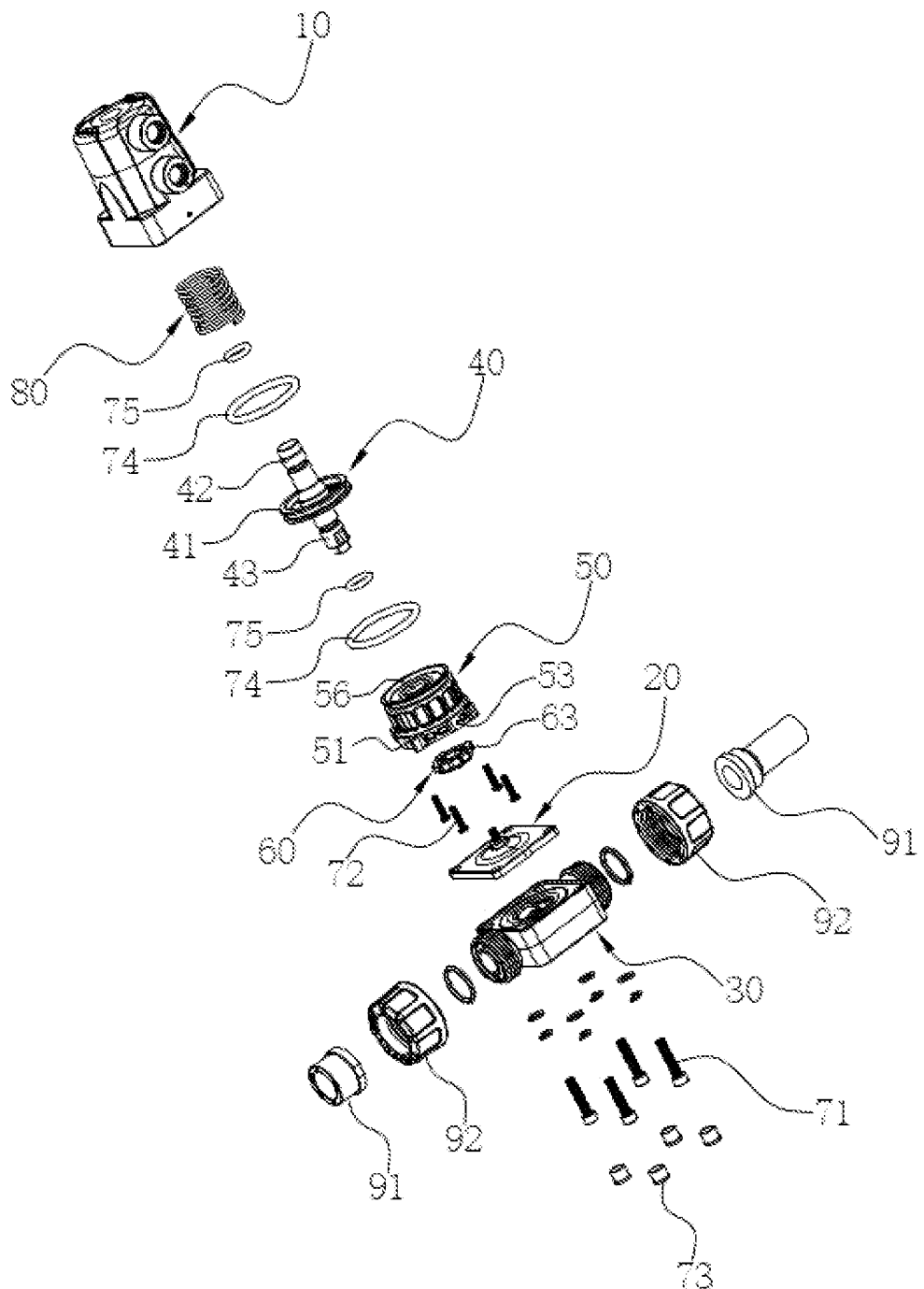
FIG. 2 is an exploded view of the corrosion-resistant diaphragm valve in some preferred examples of the present disclosure.
Figure 3:
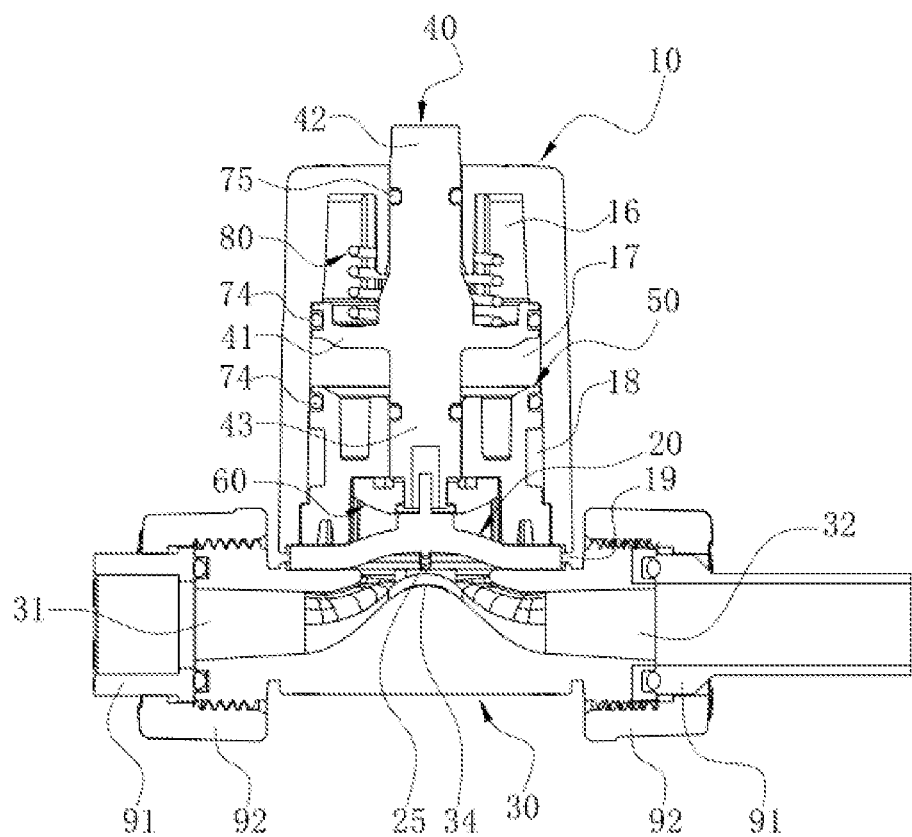
FIG. 3 is a cross-sectional view of the corrosion-resistant diaphragm valve in some preferred examples of the present disclosure, which is taken at a plane XZ.
Figure 10:
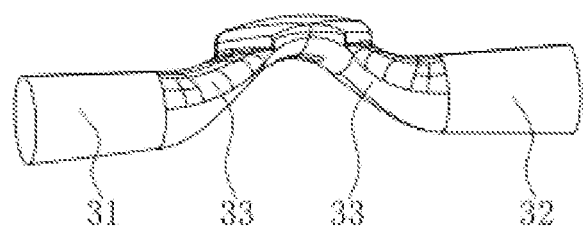
FIG. 10 is a schematic view of a runner of the corrosion-resistant diaphragm valve in some preferred examples of the present disclosure (A is a perspective view of the runner, and B is a cross-sectional view of the runner, which is taken at a plane YZ of an arc-shaped dam)
Figure 10:
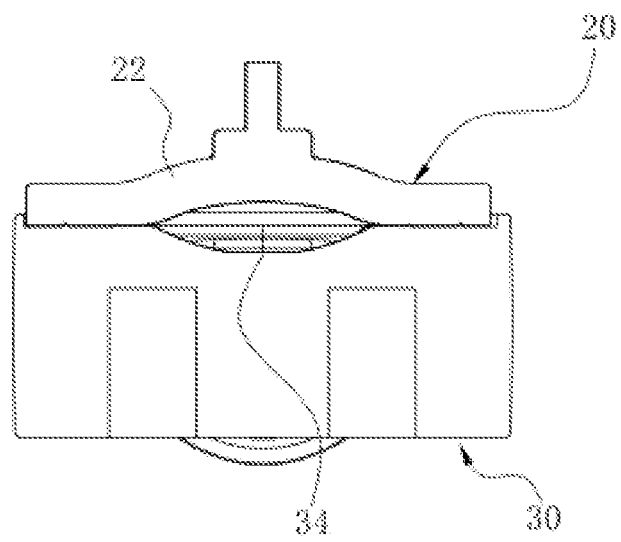

Referring to FIG. 1 to FIG. 3, some examples of the present disclosure firstly provide a corrosion-resistant diaphragm valve. FIG. 1 is a perspective assembling view of the corrosion-resistant diaphragm valve, FIG. 2 is an exploded view of the corrosion-resistant diaphragm valve, and FIG. 3 is a cross-sectional view of the corrosion-resistant diaphragm valve, which is taken at a plane XZ, wherein the plane XZ is a longitudinal plane along a runner. An example of the present disclosure provides a corrosion-resistant diaphragm valve, including: a valve cover 10 for providing pneumatically driving, a thick film diaphragm sheet 20 which acts as a valve closure, and a valve seat 30 which provides delivery of agents for semiconductor production and processing. When the valve is in an opening state, the thick film diaphragm sheet 20 moves upwards, and a first runner 31 and a second runner 32 of the valve seat 30 are communicated (as shown in FIG. 3 and FIG. 10); and when the valve is in a closing state, the thick film diaphragm sheet 20 moves downwards, and the first runner 31 and the second runner 32 are blocked by an arc-shaped dam 34 of the valve seat 30 and the thick film diaphragm sheet 20. A switching stroke between the valve opening state and the valve closing state is generally smaller than an up-and-down movement stroke when a thin film diaphragm sheet is used.

Referring to FIG. 1 to FIG. 3, the valve cover 10 is a cylinder having a square bottom frame for receiving a pneumatic driving assembly. The valve cover 10 is internally provided with a pneumatic piston member 40 which is elastically pushed outwards, a first lower opening of the valve cover 10 is embedded with a fixed non-rotatable supporting block 50, the supporting block 50 may be coupled with the valve cover 10 by utilizing a second connector 72, and the second connector 72 is specifically a short screw rod. A diaphragm pressing block 60 is connected to one end of the pneumatic piston member 40. In a specific example, the pneumatic piston member 40 has a piston disk 41, a guide rod 42 disposed above the piston disk 41, and a piston rod 43 disposed below the piston disk 41 (with co-reference to FIG. 9), and axial lifting movement of the pneumatic piston member 40 is achieved by utilizing the upper and lower pressure difference of the piston disk 41. The first function of the supporting block 50 is to limit the movable detachment of the pneumatic piston member 40; the second function of the supporting block 50 is to allow the guided sliding of the diaphragm pressing block 60 in an embedding manner, and limit the spinning movement of the diaphragm pressing block 60; the third function of the supporting block 50 is to jointly clamp and press the clamping portion 23 of the thick film diaphragm sheet 20 with the valve cover 10; and the fourth function of the supporting block 50 is to guide axial movement of the pneumatic piston member 40. The first function of the diaphragm pressing block 60 is to regulate or modify the deformed shape of the bending portion 22 of the thick film diaphragm sheet 20 when the valve is closed, and lower arcs on two sides become upper arcs on two sides to better close a passage between the first runner 31 and the second runner 32; and the second function of the diaphragm pressing block 60 is to limit the spinning of the piston rod 43 of the pneumatic piston member 40 or the valve head 21 of the thick film diaphragm sheet 20 in axial movement.

Figure 6:
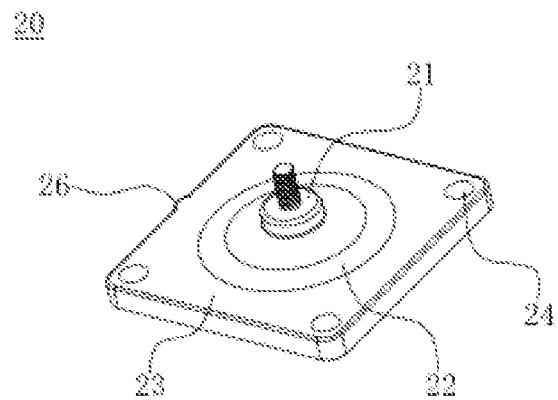
FIG. 6 is a schematic perspective view of a thick film diaphragm sheet of the corrosion-resistant diaphragm valve in some preferred examples of the present disclosure (A is a top perspective view, and B is a bottom perspective view)
Figure 6:
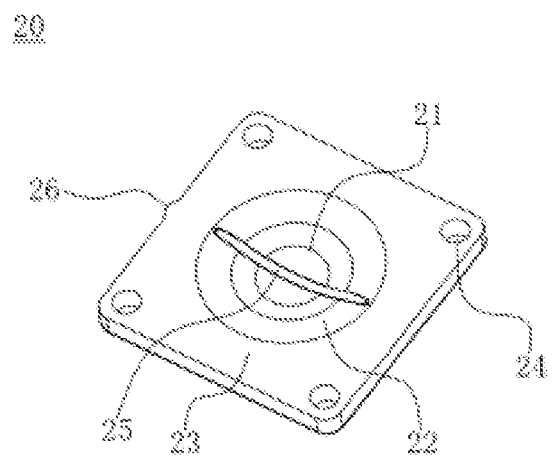
Figure 9:
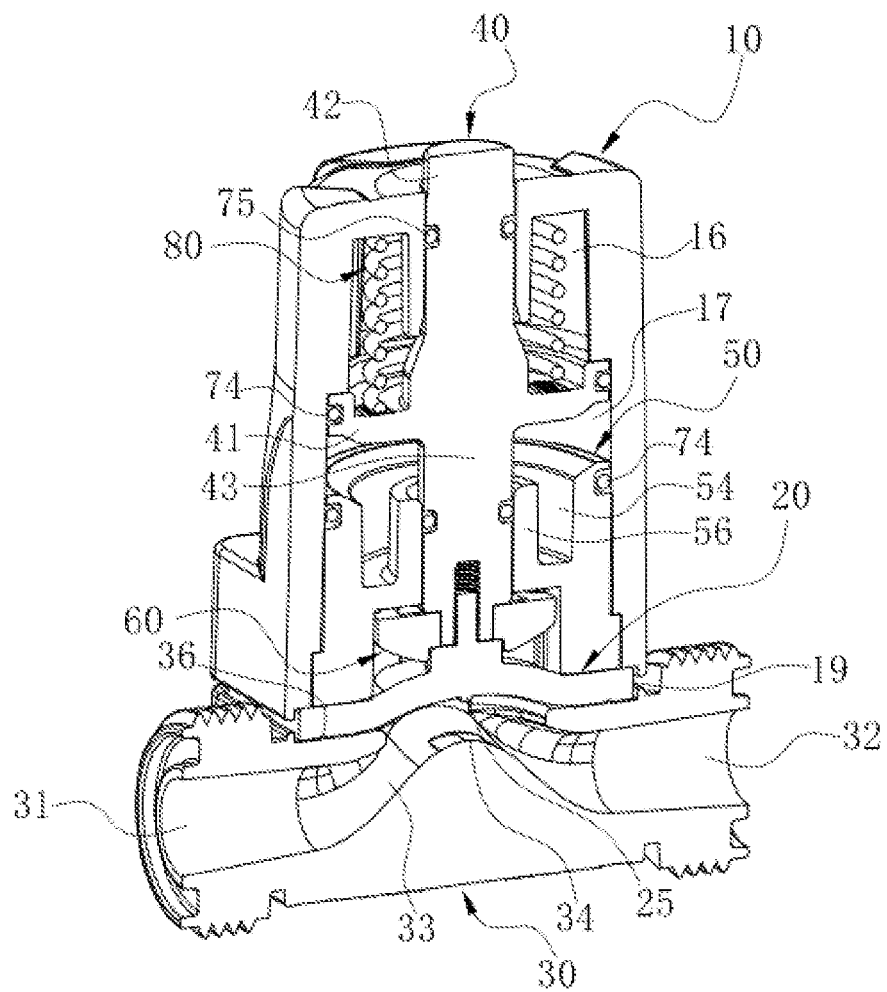
FIG. 9 is a perspective assembling view of the corrosion-resistant diaphragm valve in some preferred examples of the present disclosure, which is taken at a plane XZ.

Referring to FIG. 2 and FIG. 3, with co-reference to FIG. 6, the thick film diaphragm sheet 20 is in a shape of film, may be of a single-layer film structure or a multi-layer film composite structure, and is used for isolating the pneumatic driving assembly from a fluid working area, with the main function of closing the runner. The thick film diaphragm sheet 20 is coupled (specifically threadedly coupled) to the pneumatic piston member 40, the thick film diaphragm sheet 20 has a valve head 21 connected to the one end of the pneumatic piston member 40, a bending portion 22 extending outwards from the valve head 21, and a clamping portion 23 extending outwards from the bending portion 22, and the clamping portion 23 is provided with a plurality of peripheral through holes 24 or notches; and the lifting movement of the valve head 21 driven by the pneumatic piston member 40 determines the opening and closing of the valve, and the bending portion 22 exhibits a central upper arc curve and a central lower arc curve accordingly. The clamping portion 23 remains clamped above by the valve cover 10 and the supporting block 50 and below by the valve seat 30. Also, a straight sealing convex strip 25 extending through the valve head 21 is disposed at a bottom of the thick film diaphragm sheet 20. In a specific example, the thick film diaphragm sheet 20 is further provided with a leakage-proof annular groove at the bottom of the clamping portion 23, and the leakage-proof annular groove may be specifically of a multi-ring structure, so that a fluid does not leak from the bottom of the thick film diaphragm sheet 20 to a clamping external gap 19 between the valve cover 10 and the valve seat 30 (as shown in FIG. 1, FIG. 3 and FIG. 9), and even if the fluid accidentally leaks out, the fluid may flow out from the clamping external gap 19 which is not in direct contact between the valve seat 30 and the valve cover 10 and does not flow to an upper surface of the thick film diaphragm sheet 20. In addition, the thick film diaphragm sheet 20 is completely clamped by the valve cover 10 and the valve seat 30 and is not rotatable. The thick film diaphragm sheet 20 has the functions of shielding and preventing an outer end of the second connector 72 from corrosion.

Figure 7:
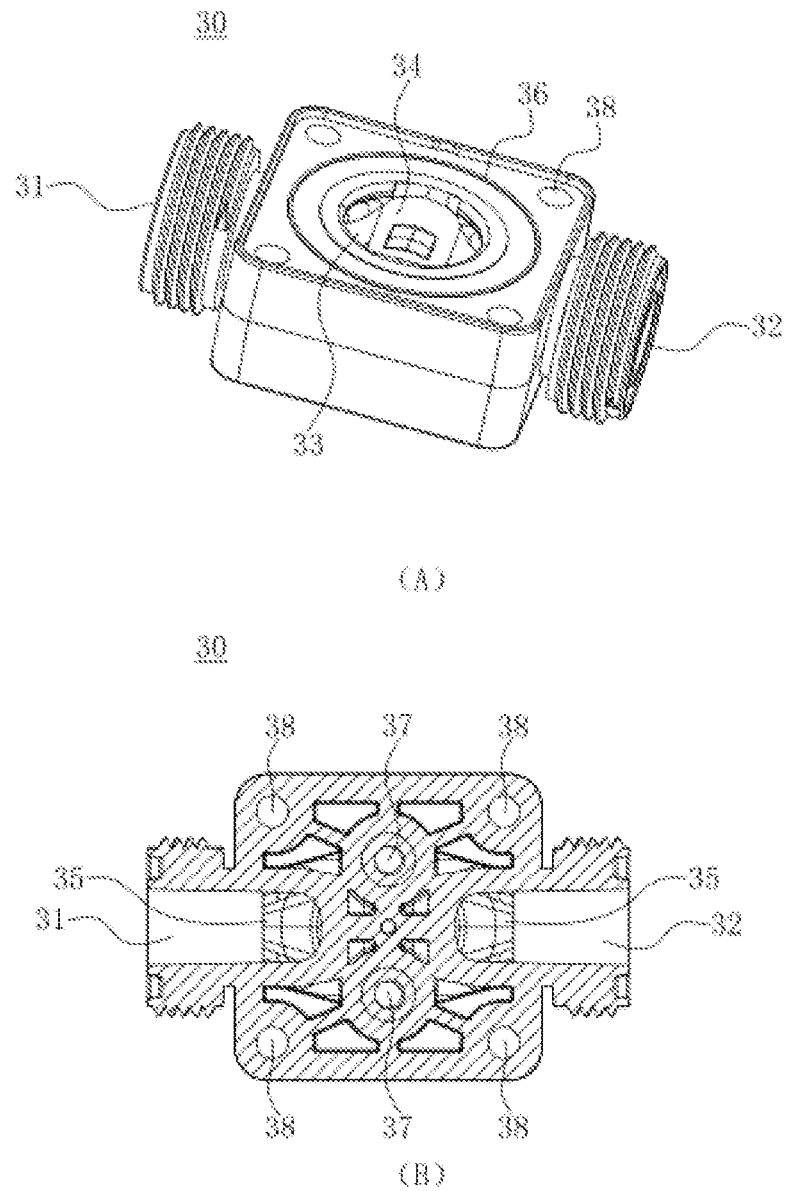
FIG. 7 is a schematic view of a valve seat of the corrosion-resistant diaphragm valve in some preferred examples of the present disclosure (A is a top perspective view of the valve seat, and B is a cross-sectional view of the valve seat at a plane XY)
Figure 8:
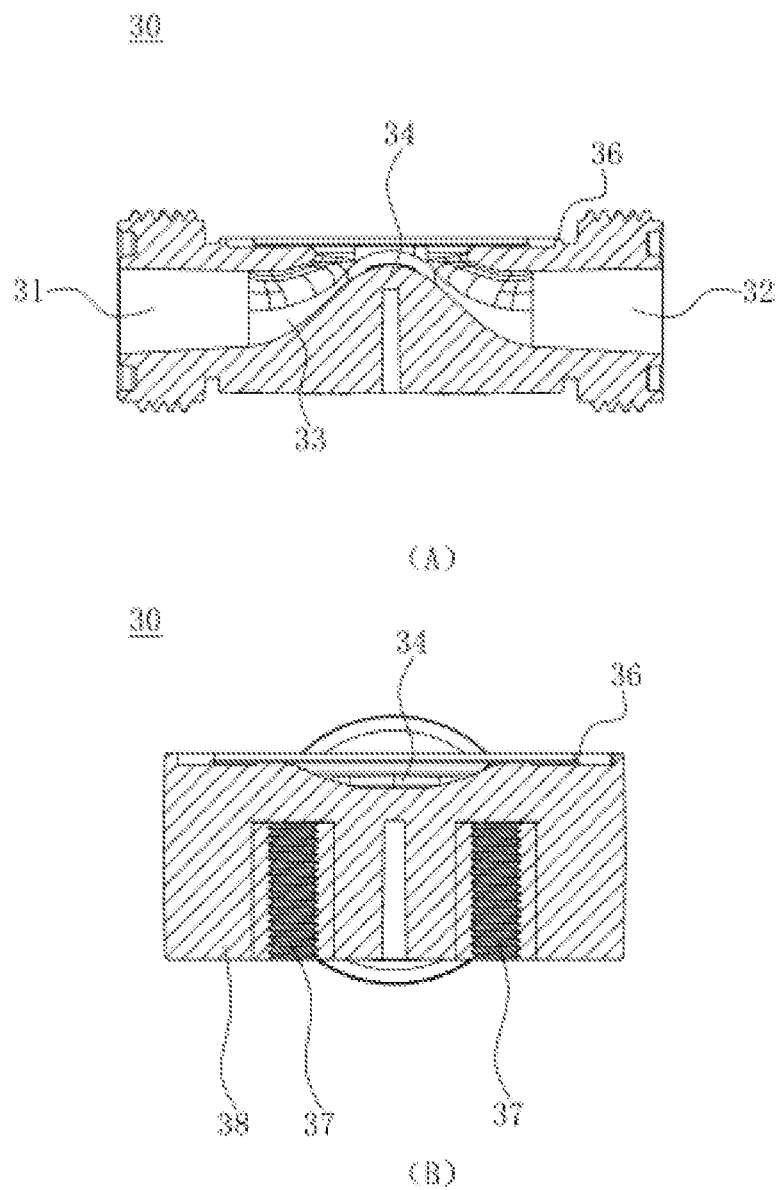
FIG. 8 is a schematic view of the valve seat of the corrosion-resistant diaphragm valve in some preferred examples of the present disclosure, which is taken at different section angles (A is a cross-sectional view of the valve seat at a plane XZ, and B is a cross-sectional view of the valve seat at a plane YZ)

Referring to FIG. 1 to FIG. 3, with co-reference to FIG. 7 and FIG. 8, the valve seat 30 has a square body to provide a closable runner. The valve seat 30 is coupled with the valve cover 10 by a first connector 71, and the first connector 71 may be specifically a long screw rod; the first connector 71 passes through the peripheral through holes 24 or notches of the thick film diaphragm sheet 20 to be connected to the valve cover 10, so as to clamp the clamping portion 23 of the thick film diaphragm sheet 20; therefore, the thick film diaphragm sheet 20 is clamped in a limiting manner. A thickness of the clamping portion 23 of the thick film diaphragm sheet 20 is sufficient so that the valve seat 30 is not in direct contact with the valve cover 10 by the first connector 71; namely the clamping external gap 19 is formed at the periphery between the valve seat 30 and the valve cover 10. The valve seat 30 is internally provided with a first runner 31 and a second runner 32 separated by an arc-shaped dam 34, curved runner structures 33 in opposite directions are formed by the first runner 31 and the second runner 32 at adjacent ends, and in a horizontal section along an axis of the runner, a curved runner C-shaped opening 35 (as shown in FIG. 7(B)) is formed in the curved runner structure 33 which is bent upwards in a flattened curve (as shown in FIG. 10(A)); and when the valve is closed, the straight sealing convex strip 25 is aligned with and pressed against the arc-shaped dam 34. With regard to the arc-shaped dam 34, a direction X is pre-defined as a moving direction of the runner, namely, the axial direction of the first runner 31 or/and the second runner 32; a direction Y is a horizontal direction perpendicularly tangent to the runner, namely, the length extension direction of the arc-shaped dam 34, which also corresponds to the extension direction of the straight sealing convex strip 25; a direction Z is a mounting direction of the valve cover, corresponding to the axial movement direction of the pneumatic piston member 40; and a center point of a coordinate system of the corrosion-resistant diaphragm valve may be set at a center point of the arc-shaped dam 34. Based on the center point, the section of the arc-shaped dam 34 at the plane YZ is in a concave arc shape, the section of the arc-shaped dam 34 at the plane XZ is in a convex arc shape, and the section of the arc-shaped dam 34 at the plane XY is in a straight strip shape when being observed. The curved runner C-shaped opening 35 with a convergent neck is a section at the plane XY along the axial direction of the first runner 31 or/and the second runner 32. Specifically, caliber of a pipeline from the first runner 31 or/and the second runner 32 to the plane YZ of the arc-shaped dam 34 changes, the caliber at the first runner 31 or/and the second runner 32 is circular, the caliber reaching the curved runner C-shaped opening 35 with the convergent neck is elliptical, and the caliber reaching the curved runner structure 33 is firstly transversely enlarged and then rapidly decreased at the bottoms of two sides, and finally becomes a concave arc in a laughing mouth shape, namely, a curvature of a side edge of the runner is higher than that of the middle of the runner. There is no sudden change in size through the overall change in the caliber of the runner, and the change is formed gradually to reduce fluid turbulence.

In the implementation of the structure example of the present disclosure, referring to FIG. 2 and FIG. 9, the supporting block 50 is utilized for being pre-embedded in the first lower opening of the valve cover 10 to pre-couple pneumatic assemblies such as the pneumatic piston member 40 in the valve cover 10, so as to pre-form a pneumatic driving mechanism. Driving movement of the pneumatic piston member 40 does not affect closing and opening of the valve except for a protruding end of the pneumatic piston member 40 and the diaphragm pressing block 60; conversely, under the isolation of the supporting block 50, the flow of a fluid does not contaminate the pneumatic driving mechanism in the valve cover 10. An upper driving chamber 16 and a lower driving chamber 17 of the valve cover 10 are separated by the piston disk 41 of the pneumatic piston member 40, an upper air pressure is provided for the upper driving chamber 16 by a first air cylinder hole 11 of the valve cover 10, a lower air pressure is provided for the lower driving chamber 17 by a second air cylinder hole 12 of the valve cover 10, and a pressure relief balancing chamber 18 separated by the supporting block 50 is balanced with the external atmospheric pressure through an outer vent hole 15 of the valve cover 10. The supporting block 50 not only separates the lower driving chamber 17 and the pressure relief balancing chamber 18 of the valve cover, but also jointly clamps and presses the clamping portion 23 of the thick film diaphragm sheet 20 with the valve cover 10. Under the upper and lower axial guide of a guide pipe above the valve cover 10 and the supporting block 50, the pneumatic piston member 40 may better drive the diaphragm pressing block 60, the diaphragm pressing block 60 is limited by the supporting block 50 and is non-rotatable, and the thick film diaphragm sheet 20 is also non-rotatable, so that the bending portion 22 of the thick film diaphragm sheet 20 accurately deforms the film when the valve is closed. In addition, the straight sealing convex strip 25 extending through the valve head 21 is disposed at the bottom of the thick film diaphragm sheet 20, so as to improve the closing effect of the valve pressed against the arc-shaped dam 34 in the valve seat 30; further, the thickness of the clamping portion 23 of the thick film diaphragm sheet 20 is sufficient so that the valve seat 30 is not in direct contact with the valve cover 10, so as to couple the valve seat 30 with the valve cover 10 while the clamping portion 23 of the thick film diaphragm sheet 20 is well clamped; furthermore, the curved runner C-shaped openings 35 are formed in the curved runner structures 33 of the valve seat 30 on two sides of the arc-shaped dam 34, and the curved runner structures 33 are bent upwards in the flattened curve, in the valve opening state, in combination with the deformed shape of the bending portion 22 of the thick film diaphragm sheet 20, a football-shaped or mesh-shaped communication opening is formed in the arc-shaped dam 34, the cross-sectional area of the communication opening may be not less than 60%, preferably not less than 80% of the cross-sectional area of the communication opening of the first runner 31 or/and the second runner 32; and in the valve opening state in which the width of the heightened arc-shaped dam 34 is enlarged to compensate for the height reduction, the thick film diaphragm sheet 20 may be opened with a relatively small amplitude, without affecting the throughput and pressure loss of the diaphragm valve when the valve is opened, and when the valve is closed, the straight sealing convex strip 25 may be accurately aligned with and pressed against the arc-shaped dam 34, the switching between opening and closing may generate obvious fluid outflow and closing, without a dripping phenomenon, which is specifically applicable to the production equipment for the semiconductor wet process.

Figure 4:
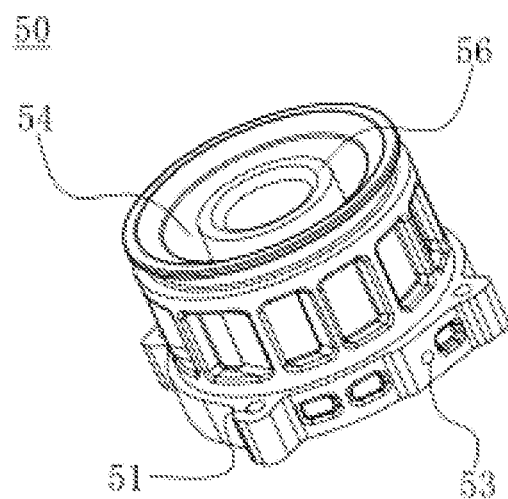
FIG. 4 is a schematic perspective view of a supporting block of the corrosion-resistant diaphragm valve in some preferred examples of the present disclosure (A is a top perspective view, and B is a bottom perspective view)
Figure 4:
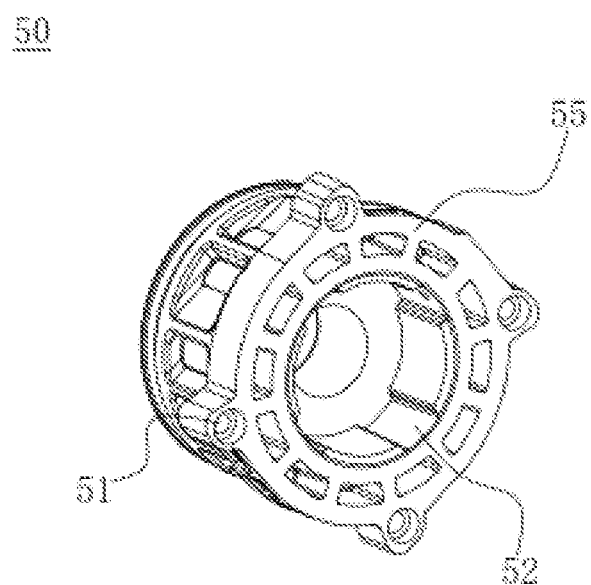

Referring to FIG. 4, with respect to the specific structure of the supporting block 50, in a preferred example, the supporting block 50 is specifically cylindrical and has a plurality of peripheral lugs, the supporting block 50 is coupled with the valve cover 10 by a second connector 72, wherein the second connector 72 is aligned with the clamping portion 23 of the thick film diaphragm sheet 20 in position, the second connector 72 passes through a lug through hole 51 of the supporting block 50 to be connected to the valve cover 10, and a lug groove is formed in the valve cover 10 at a periphery of the first lower opening to accommodate a lug of the supporting block 50. The supporting block 50 and the valve cover 10 are pre-fixed by utilizing the second connector 72, the position of the second connector 72 is also aligned with the clamping portion 23 of the thick film diaphragm sheet 20, and the second connector 72 is entirely hidden inside the diaphragm valve and not exposed to the space of the chamber. The diaphragm valve may be used for a long term if the accidental loosening of the second connector 72 may additionally improve the clamping effect of the clamping portion 23 of the thick film diaphragm sheet 20. In the example of the present disclosure, the effect that the supporting block 50 is non-rotatably embedded in the valve cover 10 is also achieved by utilizing the lug through hole 51 of the supporting block 50 through which the second connector 72 passes and matching with the lug groove of the valve cover 10 in a manner of being fixed to the valve cover 10 with the relatively short second connector 72. The clamping portion 23 of the thick film diaphragm sheet 20 may be clamped and pressed jointly by the supporting block 50 and the valve cover 10.

In a preferred example, the lug of the supporting block 50 is adjacent to a coupling hole of the valve cover 10 for being coupled with the first connector 71; and in a preferred example, a peripheral edge of the second lower opening of the supporting block 50 is provided with a sliding groove 52 (with reference to FIG. 4(B)) adapted to a side rib of the diaphragm pressing block 60, an anti-rotating guide flange 63 (with reference to FIG. 5) is formed by the side rib of the diaphragm pressing block 60, and a protruding side edge of the anti-rotating guide flange 63 may be longitudinally guided to slide in the sliding groove 52 for the diaphragm pressing block 60 to be driven to longitudinally sliding up and down in a unrotatable manner. Preferably, a protruding bottom edge (with reference to FIG. 5 (B)) of the anti-rotating guide flange 63 may press the bending portion 22 of the thick film diaphragm sheet 20 to enhance the pressing of the straight sealing convex strip 25 against the arc-shaped dam 34. In addition, positions of the second connector 72 and the first connector 71 are adjacent to each other, so that the second connector 72 is relatively away from the bending portion 22 of the thick film diaphragm sheet 20 and closer to the edge of the clamping portion 23. The peripheral edge of the second lower opening of the supporting block 50 is provided with the sliding groove 52 adapted to the side rib of the diaphragm pressing block 60, so that the supporting block 50 has the function of guiding the sliding of the diaphragm pressing block 60.

Referring again to FIG. 4, in a preferred example, the supporting block 50 further has a lateral inner vent hole 53 and an axial guide sleeve 56 for sliding of the one end of the pneumatic piston member 40. By utilizing the inner vent hole 53, when the pneumatic piston member 40 moves downwards to close the valve, air in the axial guide sleeve 56 is extruded and discharged to the pressure relief balancing chamber 18 positioned in a groove in an outer surface of a radial body of the supporting block 50 through the inner vent hole 53; and the air pressure is balanced with the external atmospheric pressure through the outer vent hole 15, so as to accelerate the action of valve closing and maintain a closing force, wherein an air pressure in the upper driving chamber 16 above the piston disk 41 may be greater than an air pressure in the lower driving chamber 17 below the piston disk 41, the lower driving chamber 17 is a relatively closed chamber, and the pressure relief balancing chamber 18 at the periphery of the supporting block 50 is communicated with the external air pressure.

Referring again to FIG. 4, in a preferred example, the supporting block 50 has an upwardly open air chamber groove 54 to increase a space of the lower driving chamber 17 of the valve cover 10 below the piston disk 41; and in the example, the air chamber groove 54 is an upwardly open annular groove. The air chamber groove 54 of the supporting block 50 is utilized to maintain a minimum volume of the lower driving chamber 17 in the valve closing state, and in the valve closing state, the valve closing effect may not be affected as the air pressure in the lower driving chamber 17 is not increased too quickly due to the downward movement of the pneumatic piston member 40 and the piston disk 41 thereof.

Referring again to FIG. 2 and FIG. 3, with respect to the mechanism of elastically pushing outwards of the pneumatic piston member 40, in a preferred example, the corrosion-resistant diaphragm valve further includes: an elastic member 80 sleeved on the guide rod 42 and elastically contacting the piston disk 41, so that the one end of the pneumatic piston member 40 protrudes without an external force. By utilizing the specific structure of the pneumatic piston member 40, based on upper guide of the guide rod 42 on the valve cover 10 and lower guide of the piston rod 43 on the supporting block 50, the piston disk 41 is not inclined, the upper driving chamber 16 and the lower driving chamber 17 in the valve cover 10 are separated, and the one end of the pneumatic piston member 40 may move axially in the direction Z. Also, by utilizing the arrangement relationship of the elastic member 80, the elastic member 80 is positioned in the upper driving chamber 16, and the one end of the pneumatic piston member 40 remains protruding without the external force, thereby facilitating the mounting of the thick film diaphragm sheet 20 and the diaphragm pressing block 60 on the pneumatic piston member 40, and allowing the valve cover 10 and the valve seat 30 to be assembled in a valve closing state, so as to obtain a better valve closing effect.

Referring again to FIG. 2 and FIG. 3, with respect to the chamber sealing of the valve cover 10, in a preferred example, the upper edge at a periphery of the piston disk 41 and the upper edge at a periphery of the supporting block 50 are respectively provided with a first sealing ring 74, and a body of the guide rod 42 and a body of the piston rod 43 are respectively provided with a second sealing ring 75, so as to divide an internal space of the valve cover 10 into an upper driving chamber 16, a lower driving chamber 17, and a pressure relief balancing chamber 18 from inside to outside (as shown in FIG. 3). By utilizing the first sealing ring 74 and the second sealing ring 75, the upper driving chamber 16, the lower driving chamber 17, and the pressure relief balancing chamber 18 are established in the valve cover 10 from inside to outside and from top to bottom. Sealing ring grooves are formed in the pneumatic piston member 40 and the supporting block 50 at corresponding portions.

Figure 5:
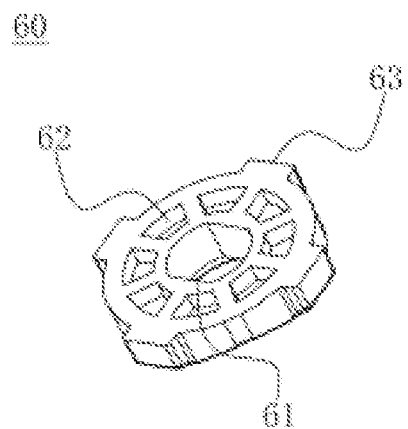
FIG. 5 is a schematic perspective view of a diaphragm pressing block of the corrosion-resistant diaphragm valve in some preferred examples of the present disclosure (A is a top perspective view, and B is a bottom perspective view)
Figure 5:
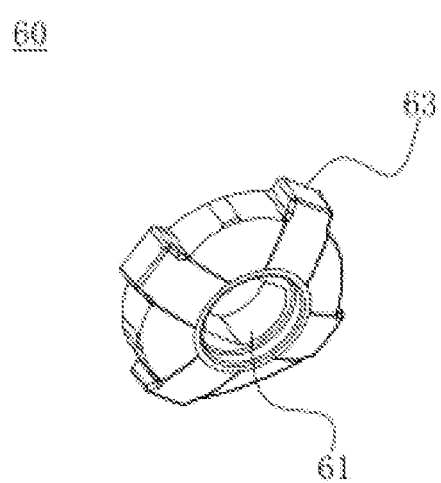

Referring to FIG. 5 and FIG. 6, with regard to the specific structure of the diaphragm pressing block 60, in a preferred example, the diaphragm pressing block 60 is provided with a non-circular hole 61 adapted to the one end of the pneumatic piston member 40 in shape; and the valve head 21 of the thick film diaphragm sheet 20 is connected to the one end of the pneumatic piston member 40 to be detachably connected to the diaphragm pressing block 60. By utilizing the shape of the diaphragm pressing block 60 adapted to that of the one end of the pneumatic piston member 40, when the diaphragm pressing block 60 may not rotate, the pneumatic piston member 40 may not rotate arbitrarily, and the thick film diaphragm sheet 20 is less susceptible to torsional stress and has a longer service life. The valve head 21 of the thick film diaphragm sheet 20 is connected to the one end of the pneumatic piston member 40, so that the diaphragm pressing block 60 is limited and fixed above the valve head 21 of the thick film diaphragm sheet 20. In a preferred example, the diaphragm pressing block 60 is provided with a plurality of lightening cavities 62 at a periphery of the non-circular hole 61, so as to reduce the weight of the diaphragm pressing block 60 to facilitate lifting and sliding driven by the pneumatic piston member 40. When the diaphragm pressing block 60 is limited to be non-rotatable, the straight sealing convex strip 25 of the thick film diaphragm sheet 20 is also non-rotatable to be aligned with the arc-shaped dam 34.

Referring to FIG. 7 and FIG. 8, with regard to the specific structure of the valve seat 30, in a preferred example, the valve seat 30 is provided with an upwardly protruding clamping ring 36 at a periphery of a valve port moving at the valve head 21 of the thick film diaphragm sheet 20, the arc-shaped dam 34 is exposed in the circular valve port around the circular valve port of the valve seat 30, the supporting block 50 has a downwardly facing clamping and pressing surface 55, and the clamping ring 36 is aligned in the clamping and pressing surface 55. The clamping ring 36 of the valve seat 30 is utilized for being aligned in the clamping and pressing surface 55 of the supporting block 50, the clamping and pressing surface 55 of the supporting block 50 forms a non-uniform clamping and pressing force to the clamping portion 23 of the thick film diaphragm sheet 20, and an annular clamping and pressing force may be specially increased above the clamping ring 36, so as to reduce the sliding of the clamping portion 23 of the thick film diaphragm sheet 20. With regard to the specific shape of the arc-shaped dam 34, referring to FIG. 7(A), the arc-shaped dam 34 is exposed in the circular valve port in an elevated form but does not exceed the circular valve port; referring to FIG. 7(B), the curved runner C-shaped openings 35 are formed in two sides of the section XY of the arc-shaped dam 34; referring to FIG. 8(A), the arc-shaped dam 34 has a convex arc shape at the section XZ; and referring to FIG. 8(B), the arc-shaped dam 34 has a concave arc shape at the section YZ. As shown in FIG. 7(B) and FIG. 8(B), two or more connecting holes 37 facing the bottom of the valve seat 30 are formed in the arc-shaped dam 34 for the mounting and coupling of the corrosion-resistant diaphragm valve. A corner of the valve seat 30 is provided with a through hole 38 through which the first connector 71 passes.

Referring to FIG. 6 and FIG. 3, with regard to the specific structure of the thick film diaphragm sheet 20, in a preferred example, the thickness of the bending portion 22 is not less than 80% of the thickness of the clamping portion 23, so that an amount of deformation of the bending portion 22 in an upper arc of valve opening does not exceed an upper edge of the clamping portion 23, and an amount of deformation of the bending portion 22 in a lower arc of valve closing does not exceed a lower edge of the clamping portion 23. The thickness of the clamping portion 23 of the thick film diaphragm sheet 20 may be 4-8 mm, which is applicable to the caliber of DN15-DN65; and when the caliber of the runner opening is larger, the thickness of the clamping portion 23 should be adjusted to be thicker. By defining the portion of the thick film diaphragm sheet 20, the amount of deformation of the bending portion 22 in the upper arc of valve opening does not exceed the upper edge of the clamping portion 23, so that there is a relatively small amount of deformation in the upper arc and the lower arc, the thick film diaphragm sheet 20 has high durability, and in combination with other necessary technical means, the diaphragm valve also has the features of a large throughput and low pressure loss. In addition, the material of the thick film diaphragm sheet 20 may be selected from any one of EPDM (ethylene-propylene-diene monomer), FPM (fluorine rubber) and PTFE (polytetrafluoroethylene) or a combination of composite layers thereof, with good chemical corrosion resistance.

With regard to a more specific structure of the thick film diaphragm sheet 20, in a preferred example, the thickness of the clamping portion 23 of the thick film diaphragm sheet 20 is equal to a thickness of the bending portion 22; and wherein the bending portion 22 has an annular shape outside the valve head 21, and the clamping portion 23 has a square shape outside the bending portion 22. The thickness of the clamping portion 23 of the thick film diaphragm sheet 20 is equal to the thickness of the bending portion 22, and the thickness of the bending portion 22 is between 80% and 100% of the thickness of the clamping portion 23, so as to improve the durability of the thick film diaphragm sheet 20 and reduce the deformation and damage of the bending portion 22. The deformation of the bending portion 22 in a lifting process of the valve head 21 is also facilitated by utilizing the annular shape of the bending portion 22.

The square shape of the clamping portion 23 may improve the positioning effect before clamping and the anti-rotating property after clamping, so that the straight sealing convex strip 25 is not inclined relative to the arc-shaped dam 34 in the case of long-term valve opening and closing. In addition, referring to FIG. 6(A), the peripheral through hole 24 of the thick film diaphragm sheet 20 is positioned at the corner of the clamping portion 23 for the first connector 71 to pass through; and the valve head 21 of the thick film diaphragm sheet 20 is provided with a connecting screw rod to be coupled to a threaded portion of the pneumatic piston member 40 at the one end of the piston rod 43 (specifically as shown in FIG. 2 and FIG. 3).

Referring again to FIG. 6, in a preferred example, the thick film diaphragm sheet 20 further has an anti-rotating resetting convex portion 26 outside the clamping portion 23, so as to enable the clamping portion 23 of the thick film diaphragm sheet 20 to achieve micro-amplitude resetting in the case of clamping with a non-rotatable alignment feature in a process from closing to opening of the valve. The anti-rotating resetting convex portion 26 is specifically in a convex arc shape beyond the boundary.

In a preferred example, two ends of the straight sealing convex strip 25 extend to an edge of the bending portion 22. Therefore, when the valve is closed, a portion of the straight sealing convex strip 25 extending to the bending portion 22 is supported by the diaphragm pressing block 60 to be pressed against the arc-shaped dam 34, so as to improve the valve closing effect of the diaphragm valve. The formation of the straight sealing convex strip 25 is used for solving or avoiding the dripping phenomenon in the case of micro-amplitude mismatching of shapes of a concave arc of the arc-shaped dam 34 and a deformed concave arc of the bending portion 22 of the thick film diaphragm sheet 20 when the valve is closed in a direction YZ of a truncation surface of the runner, wherein a direction X is a moving direction of the runner, a direction Y is a horizontal direction perpendicularly tangent to the runner, and a direction Z is a mounting direction of the valve cover 10. The thickness of the straight sealing convex strip 25 is 1-3 mm, which is applicable to the caliber of DN15-DN65, and when the caliber of the runner opening is larger, the thickness of the straight sealing convex strip 25 should be adjusted to be thicker. The shape of the straight sealing convex strip 25 may be straight, an I-shape, an II-shape or an ") (" shape.

An example of the present disclosure further provides production equipment for a semiconductor wet process, including the corrosion-resistant diaphragm valve as described above (as shown in FIG. 9). On the premise of improving the durability of the diaphragm sheet, the process agent liquid may be supplied with a large flow and delivered with low pressure loss, without leakage after closing.

Figure 11:
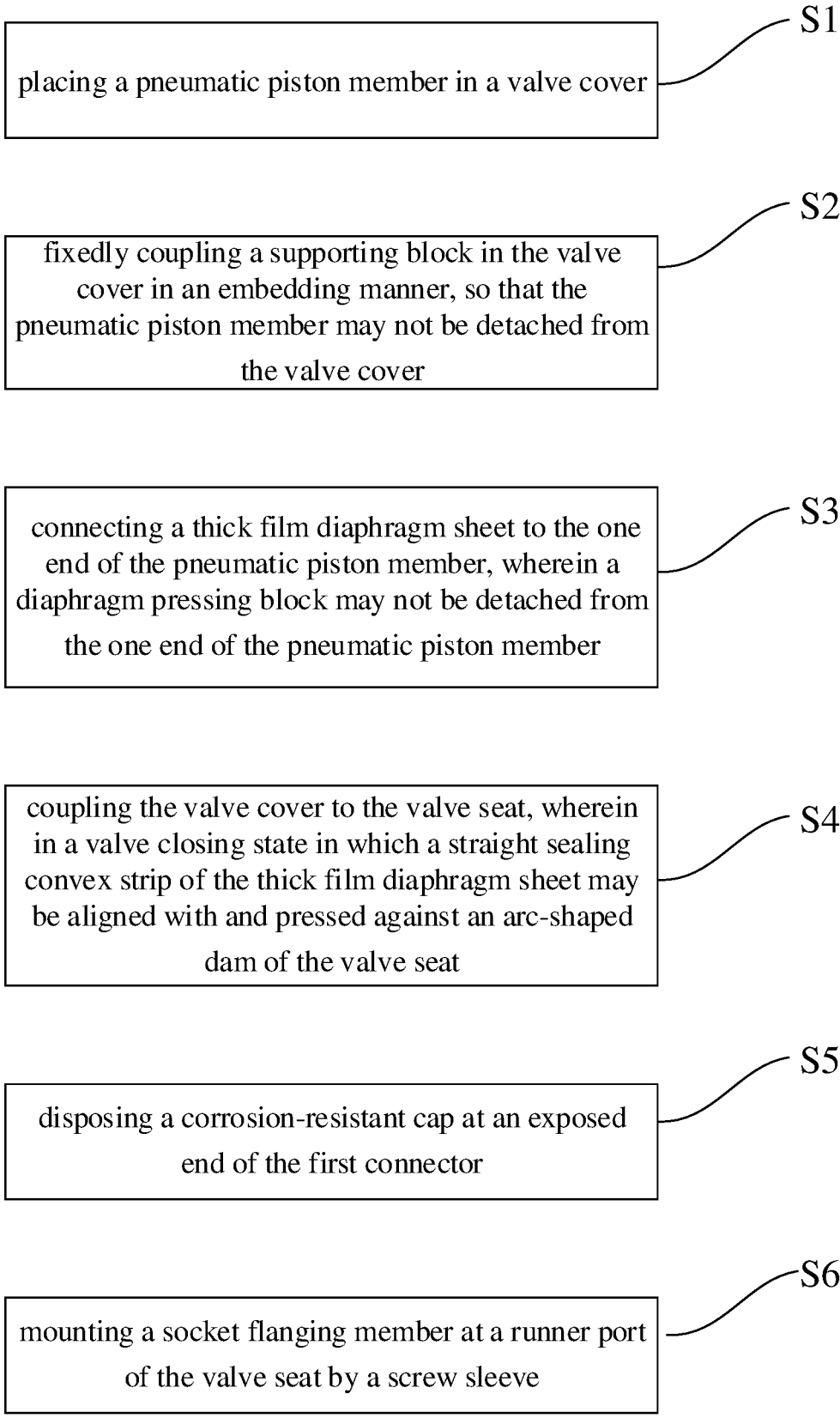
FIG. 11 is a schematic view of steps of an assembling method of the corrosion-resistant diaphragm valve in some preferred examples of the present disclosure.

Referring to FIG. 11, FIG. 2, FIG. 9 and the accompanying drawings of related components, an example of the present disclosure further provides an assembling method of the corrosion-resistant diaphragm valve, including the following steps:

S1. placing a pneumatic piston member 40 in a valve cover 10; simultaneously firstly placing an elastic member 80 in the valve cover 10;

S2. fixedly coupling a supporting block 50 in the valve cover 10 in an embedding manner by utilizing a second connector 72, so that the pneumatic piston member 40 may not be detached from the valve cover 10, and one end of the pneumatic piston member 40 remains protruding;

S3. connecting a thick film diaphragm sheet 20 to the one end of the pneumatic piston member 40, wherein the one end is in a protruding state, and a diaphragm pressing block 60 may not be detached from the one end of the pneumatic piston member 40; and S4. coupling the valve cover 10 to the valve seat 30 by utilizing a first connector 71, wherein in a valve closing state in which a straight sealing convex strip 25 of the thick film diaphragm sheet 20 may be aligned with and pressed against an arc-shaped dam 34 of the valve seat 30, the valve cover 10 is coupled by the first connector 71, and a clamping portion 23 of the thick film diaphragm sheet 20 is clamped and pressed jointly by the valve cover 10 and the supporting block 50; wherein in step S4, the clamping portion 23 of the thick film diaphragm sheet 20 is clamped by the valve cover 10, the supporting block 50, and the valve seat 30; the first connector 71 also passes through a peripheral through hole 24 of the thick film diaphragm sheet 20 to form a positional clamping of the diaphragm sheet; after step S4, the valve cover 10 is not in direct contact with the valve seat 30, a clamping external gap 19 is formed at the periphery between the valve cover 10 and the valve seat 30, a sufficient clamping force is obtained by the clamping portion 23 of the thick film diaphragm sheet 20, and a fluid in the valve seat 30 at most overflows to the clamping external gap 19 without contaminating an upper driving chamber 16 and a lower driving chamber 17 inside the valve cover 10.

The implementation principle of the method example is that detachment of the pneumatic piston member 40 in subsequent steps is prevented in advance by utilizing the supporting block 50 in step S2. Also, by utilizing steps S3 and S4, in the valve closing state, the valve cover 10 and the valve seat 30 are assembled, and the straight sealing convex strip 25 of the thick film diaphragm sheet 20 remains pressed against the arc-shaped dam 34 of the valve seat 30 to ensure a better assembling margin, without changing or weakening the valve closing effect.

In a preferred example, with co-reference to FIG. 2, the assembling method further includes: S5. disposing a corrosion-resistant cap 73 at an exposed end of the first connector 71; an exposed end of the second connector 72 may be shielded by the clamping portion 23 of the thick film diaphragm sheet 20; while the elastic member 80 is hidden in the upper driving chamber 16 of the valve cover 10, and also has a corrosion-resistant effect. In a preferred example, the assembling method further includes: S6. mounting a socket flanging member 91 at a runner port of the valve seat 30 by a screw sleeve 92 to be fixedly connected to a pipeline. An external pipe is firstly sleeved into the socket flanging member 91 to enlarge a pipe diameter, and a screw sleeve 92 is gradually locked to runner ports (external threads of two end ports of the valve seat 30 as shown in FIG. 9) of the valve seat 30 in a first runner 31 and a second runner 32, and forms a clamping effect on the expanded pipe on an outer surface of the socket flanging member 91.

The examples of the present specific embodiments are to be considered as preferred examples for the purpose of facilitating the understanding and practice of the present disclosure, and are not intended to limit the protection scope of the present disclosure, and any equivalent change made in accordance with the structure, shape and principle of the present disclosure shall be covered by the protection scope claimed by the present disclosure.

What is claimed is:

1. A corrosion-resistant diaphragm valve, comprising:
a valve cover, wherein the valve cover is internally provided with a pneumatic piston member that is configured to elastically push outwards, a fixed non-rotatable supporting block is provided in a first lower opening, a guided diaphragm pressing block is provided in a second lower opening of the fixed non-rotatable supporting block, and the guided diaphragm pressing block is connected to a first end of the pneumatic piston member;
a film diaphragm sheet coupled to the pneumatic piston member, wherein the film diaphragm sheet has a valve head connected to the first end of the pneumatic piston member, a bending portion extending outwards from the valve head, and a clamping portion extending outwards from the bending portion; the clamping portion is provided with a plurality of peripheral through holes or notches; and a straight sealing convex strip extending through the valve head is disposed at a bottom of the film diaphragm sheet; and
a valve seat coupled with the valve cover by a first connector, wherein the first connector passes through the plurality of peripheral through holes or notches of the film diaphragm sheet to connect to the valve cover to clamp the clamping portion of the film diaphragm sheet; and
wherein a thickness of the clamping portion of the film diaphragm sheet is sufficient so that the valve seat is not in direct contact with the valve cover; the valve seat is internally provided with a first runner and a second runner separated by an arc-shaped dam, the first runner and the second runner are in communication with each other at adjacent ends of the first runner and the second runner to form a curved runner structure, and in a horizontal section along an axis of the first runner and the second runner, a curved runner C-shaped opening is provided in the curved runner structure, which is bent upwards in a flattened curve; and when the corrosion-resistant diaphragm valve is closed, the straight sealing convex strip is aligned with and pressed against the arc-shaped dam.

2. The corrosion-resistant diaphragm valve according to claim 1, wherein the thickness of the clamping portion of the film diaphragm sheet is equal to a thickness of the bending portion; and wherein the bending portion has an annular shape outside the valve head, and the clamping portion has a square shape outside the bending portion.

3. The corrosion-resistant diaphragm valve according to claim 2, wherein the film diaphragm sheet further has an anti-rotating resetting convex portion outside the clamping portion.

4. The corrosion-resistant diaphragm valve according to claim 2, wherein two ends of the straight sealing convex strip extend to an edge of the bending portion.

5. The corrosion-resistant diaphragm valve according to claim 1, wherein the fixed non-rotatable supporting block is coupled with the valve cover by a second connector, the second connector aligned with the clamping portion of the film diaphragm sheet passes through a lug through hole of the fixed non-rotatable supporting block to be connected to the valve cover, and a lug groove is formed in the valve cover at a periphery of the first lower opening for accommodating a lug of the fixed non-rotatable supporting block.

6. The corrosion-resistant diaphragm valve according to claim 5, wherein the lug of the fixed non-rotatable supporting block is adjacent to a coupling hole of the valve cover for being coupled with the first connector.

7. The corrosion-resistant diaphragm valve according to claim 5, wherein a peripheral edge of the second lower opening of the fixed non-rotatable supporting block is provided with a sliding groove adapted to a side rib of the guided diaphragm pressing block, and an anti-rotating guide flange is formed by the side rib of the guided diaphragm pressing block for a longitudinal sliding of the guided diaphragm pressing block in a unrotatable manner.

8. The corrosion-resistant diaphragm valve according to claim 5, wherein the fixed non-rotatable supporting block further has a lateral inner vent hole and an axial guide sleeve for sliding of the first end of the pneumatic piston member.

9. The corrosion-resistant diaphragm valve according to claim 1, wherein the guided diaphragm pressing block is provided with a non-circular hole adapted to the first end of the pneumatic piston member in shape; and the valve head of the film diaphragm sheet is connected to the first end of the pneumatic piston member to be detachably connected to the guided diaphragm pressing block.

10. The corrosion-resistant diaphragm valve according to claim 9, wherein the guided diaphragm pressing block is provided with a plurality of lightening cavities at a periphery of the non-circular hole.

11. The corrosion-resistant diaphragm valve according to claim 1, wherein a thickness of the bending portion is not less than 80% of the thickness of the clamping portion, so that an amount of deformation of the bending portion in an upper arc of valve opening does not exceed an upper edge of the clamping portion, and an amount of deformation of the bending portion in a lower arc of valve closing does not exceed a lower edge of the clamping portion.

12. The corrosion-resistant diaphragm valve according to claim 11, wherein the pneumatic piston member has a piston disk, a guide rod disposed above the piston disk, and a piston rod disposed below the piston disk; and the corrosion-resistant diaphragm valve further comprises: an elastic member, the elastic member is sleeved on the guide rod and elastically contacting the piston disk, so that the first end of the pneumatic piston member protrudes without an external force.

13. The corrosion-resistant diaphragm valve according to claim 12, wherein the fixed non-rotatable supporting block has an upwardly open air chamber groove to increase a space of a lower driving chamber of the valve cover below the piston disk.

14. The corrosion-resistant diaphragm valve according to claim 12, wherein the valve seat is provided with an upwardly protruding clamping ring at a periphery of a valve port moving at the valve head of the film diaphragm sheet, the fixed non-rotatable supporting block has a downwardly facing clamping and pressing surface, and the upwardly protruding clamping ring is aligned in the downwardly facing clamping and pressing surface.

15. The corrosion-resistant diaphragm valve according to claim 12, wherein a periphery of the piston disk and a periphery of the fixed non-rotatable supporting block are respectively provided with a first sealing ring, and a body of the guide rod and a body of the piston rod are respectively provided with a second sealing ring, so as to divide an internal space of the valve cover into an upper driving chamber, a lower driving chamber, and a pressure relief balancing chamber from inside to outside.

\* \* \* \* \*